(12) United States Patent
Shiono et al.

(10) Patent No.: US 8,277,551 B2
(45) Date of Patent: Oct. 2, 2012

(54) INK SET, RECORDING APPARATUS, AND RECORDING METHOD

(75) Inventors: Shohei Shiono, Matsumoto (JP); Tsuyoshi Sano, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 419 days.

(21) Appl. No.: 12/708,611

(22) Filed: Feb. 19, 2010

(65) Prior Publication Data

US 2010/0212543 A1    Aug. 26, 2010

(30) Foreign Application Priority Data

Feb. 23, 2009   (JP) ................................ 2009-039369

(51) Int. Cl.
*C09D 11/02* (2006.01)
*B41J 2/01* (2006.01)
(52) U.S. Cl. ...................... 106/31.6; 347/100
(58) Field of Classification Search .................. 106/31.6; 347/100
See application file for complete search history.

(56) References Cited

U.S. PATENT DOCUMENTS

| | | | |
|---|---|---|---|
| 5,236,498 A | 8/1993 | Zaloum et al. |
| 5,811,213 A | 9/1998 | Chiba |
| 5,846,306 A | 12/1998 | Kubota et al. |
| 5,958,129 A | 9/1999 | Urban et al. |
| 6,152,999 A | 11/2000 | Erdtmann et al. |
| 6,153,000 A | 11/2000 | Erdtmann et al. |
| 6,336,721 B1 | 1/2002 | Provost et al. |
| 6,399,674 B1 | 6/2002 | Kashiwazaki et al. |
| 6,419,733 B1 | 7/2002 | Sano et al. |
| 6,491,748 B2 | 12/2002 | Watanabe |
| 6,562,121 B2 | 5/2003 | Nickel et al. |
| 6,715,868 B2 | 4/2004 | Schmidt et al. |
| 6,802,893 B1 | 10/2004 | Komatsu et al. |
| 6,835,242 B2 | 12/2004 | Nickel et al. |
| 6,843,840 B2 | 1/2005 | Kataoka et al. |

(Continued)

FOREIGN PATENT DOCUMENTS

CN    1464900 A    12/2003

(Continued)

OTHER PUBLICATIONS

Patent English Abstract of Japanese Application 2007-297595A Published Nov. 15, 2007.

(Continued)

*Primary Examiner* — Helene Klemanski
(74) *Attorney, Agent, or Firm* — Ladas & Parry LLP

(57) ABSTRACT

An ink set includes a cyan ink composition containing C. I. Pigment Blue 15:6 as a pigment; a magenta ink composition containing a quinacridone pigment selected from the group consisting of C. I. Pigment Violet 19, C. I. Pigment Red 122, C. I. Pigment Red 202, and C. I. Pigment Red 209 or a quinacridone solid solution pigment composed of at least two selected from the group; a yellow ink composition containing a pigment selected from the group consisting of C. I. Pigment Yellow 74, C. I. Pigment Yellow 213, and C. I. Pigment Yellow 185; a light magenta ink composition containing a quinacridone pigment selected from the group consisting of C. I. Pigment Violet 19, C. I. Pigment Red 122, C. I. Pigment Red 202, and C. I. Pigment Red 209 or a quinacridone solid solution pigment composed of at least two selected from the group at a pigment concentration lower than that of the magenta ink composition; and a light cyan ink composition containing C. I. Pigment Blue 15:3 as a pigment at a pigment concentration lower than that of the cyan ink composition.

10 Claims, 5 Drawing Sheets

U.S. PATENT DOCUMENTS

| | | |
|---|---|---|
| 6,846,110 B2 | 1/2005 | Lutz et al. |
| 6,846,353 B2 | 1/2005 | Sano et al. |
| 6,849,110 B2 | 2/2005 | Sano |
| 6,877,851 B2 | 4/2005 | Watanabe |
| 6,924,327 B2 | 8/2005 | Sano et al. |
| 7,015,259 B2 | 3/2006 | Kataoka et al. |
| 7,156,910 B2 | 1/2007 | Koganehira et al. |
| 7,332,023 B2 | 2/2008 | Rehman et al. |
| 7,384,466 B2 | 6/2008 | Sano et al. |
| 7,462,231 B2 | 12/2008 | Koganehira et al. |
| 7,481,524 B2 | 1/2009 | Yamamoto et al. |
| 7,494,538 B2 | 2/2009 | Koganehira et al. |
| 7,537,652 B2 | 5/2009 | Koganehira et al. |
| 7,670,418 B2 | 3/2010 | Kato et al. |
| 7,686,876 B2 | 3/2010 | Koganehira et al. |
| 7,703,908 B2 | 4/2010 | Nishizaki et al. |
| 7,731,789 B2 | 6/2010 | Aoki et al. |
| 7,844,667 B2 | 11/2010 | Ito et al. |
| 7,871,466 B2 | 1/2011 | Koganehira et al. |
| 7,871,467 B2 * | 1/2011 | Sano et al. .................. 106/31.6 |
| 8,016,930 B2 * | 9/2011 | Sato et al. ................... 106/31.6 |
| 8,038,783 B2 | 10/2011 | Shiono et al. |
| 8,092,583 B2 * | 1/2012 | Shiono et al. ............... 106/31.6 |
| 8,172,933 B2 * | 5/2012 | Shiono et al. ............... 106/31.6 |
| 2003/0029355 A1 | 2/2003 | Miyabayashi |
| 2003/0097961 A1 | 5/2003 | Yatake et al. |
| 2003/0116055 A1 | 6/2003 | Kubota et al. |
| 2004/0246321 A1 | 12/2004 | Takashima et al. |
| 2005/0011403 A1 | 1/2005 | Mitina et al. |
| 2005/0028429 A1 | 2/2005 | Schneidmiller |
| 2005/0039632 A1 | 2/2005 | Yamamoto et al. |
| 2005/0041082 A1 | 2/2005 | Kataoka |
| 2005/0190244 A1 | 9/2005 | Tyrell |
| 2005/0203210 A1 | 9/2005 | Kataoka et al. |
| 2005/0235867 A1 | 10/2005 | Jackson et al. |
| 2005/0235870 A1 | 10/2005 | Ishihara |
| 2005/0284329 A1 | 12/2005 | Jackson et al. |
| 2005/0284330 A1 | 12/2005 | Jackson |
| 2005/0284332 A1 | 12/2005 | Shinjo et al. |
| 2006/0082629 A1 | 4/2006 | Kato et al. |
| 2006/0232650 A1 | 10/2006 | Sugimoto et al. |
| 2006/0264535 A1 | 11/2006 | Oyanagi et al. |
| 2007/0002109 A1 | 1/2007 | Sato et al. |
| 2007/0097193 A1 | 5/2007 | Ma et al. |
| 2007/0112095 A1 | 5/2007 | Moribe et al. |
| 2007/0266887 A1 | 11/2007 | Koganehira et al. |
| 2008/0028980 A1 * | 2/2008 | Aoki et al. .................. 106/31.6 |
| 2008/0047463 A1 * | 2/2008 | Tanoue et al. ............... 106/31.6 |
| 2008/0092772 A1 | 4/2008 | Rehman et al. |
| 2008/0233362 A1 * | 9/2008 | Kato et al. .................. 106/31.6 |
| 2009/0030144 A1 | 1/2009 | Mizutani et al. |
| 2009/0138566 A1 | 5/2009 | Ito et al. |
| 2009/0142555 A1 | 6/2009 | Sano et al. |
| 2009/0169834 A1 | 7/2009 | Sano et al. |
| 2009/0176071 A1 | 7/2009 | Koganehira et al. |
| 2009/0181219 A1 | 7/2009 | Saito et al. |
| 2009/0196995 A1 | 8/2009 | Saito et al. |
| 2009/0297712 A1 * | 12/2009 | Kasahara et al. ............. 427/256 |
| 2009/0297716 A1 | 12/2009 | Koganehira et al. |
| 2009/0297790 A1 | 12/2009 | Sato et al. |
| 2009/0304927 A1 | 12/2009 | Kamibayashi et al. |
| 2009/0308279 A1 | 12/2009 | Koganehira et al. |
| 2009/0315962 A1 | 12/2009 | Kataoka |
| 2009/0317606 A1 | 12/2009 | Kataoka |
| 2009/0317607 A1 | 12/2009 | Kataoka |
| 2010/0010121 A1 | 1/2010 | Koganehira et al. |
| 2010/0043670 A1 | 2/2010 | Shiono et al. |
| 2010/0080962 A1 | 4/2010 | Koganehira et al. |
| 2010/0086685 A1 | 4/2010 | Mizutani et al. |
| 2010/0087595 A1 | 4/2010 | Koganehira et al. |
| 2010/0212543 A1 | 8/2010 | Shiono et al. |
| 2010/0289848 A1 | 11/2010 | Koganehira et al. |
| 2011/0132228 A1 | 6/2011 | Shiono et al. |
| 2011/0310165 A1 | 12/2011 | Sato et al. |

FOREIGN PATENT DOCUMENTS

| | | |
|---|---|---|
| DE | 69705904 T | 9/1998 |
| DE | 69828579 T | 6/2005 |
| EP | 0778321 A2 | 6/1997 |
| EP | 0827039 A1 | 3/1998 |
| EP | 0851005 A2 | 7/1998 |
| EP | 0933406 A1 | 8/1999 |
| EP | 1164173 A1 | 12/2001 |
| EP | 1391301 A1 | 2/2004 |
| EP | 1403334 A1 | 3/2004 |
| EP | 1457535 A1 | 9/2004 |
| EP | 1676893 A1 | 7/2006 |
| EP | 1741762 A1 | 1/2007 |
| EP | 1811003 A1 | 7/2007 |
| EP | 1908806 A1 | 4/2008 |
| JP | 08-123017 A | 5/1996 |
| JP | 10-123760 A | 5/1998 |
| JP | 10-219166 A | 8/1998 |
| JP | 10-330640 A | 12/1998 |
| JP | 11-005230 A | 1/1999 |
| JP | 11-049998 | 2/1999 |
| JP | 11-166128 A | 6/1999 |
| JP | 2000-319534 A | 11/2000 |
| JP | 2000-351928 A | 12/2000 |
| JP | 2000-355667 A | 12/2000 |
| JP | 2001-106951 A | 4/2001 |
| JP | 2002-030230 A | 1/2002 |
| JP | 2002-100959 A | 4/2002 |
| JP | 2003-012583 A | 1/2003 |
| JP | 2003-123760 A | 4/2003 |
| JP | 2003-160750 A | 6/2003 |
| JP | 2003-213179 A | 7/2003 |
| JP | 2003-253150 A | 9/2003 |
| JP | 2003-253167 A | 9/2003 |
| JP | 2003-266913 A | 9/2003 |
| JP | 2003-268275 A | 9/2003 |
| JP | 2003-292835 A | 10/2003 |
| JP | 2003-313480 A | 11/2003 |
| JP | 2004-051881 A | 2/2004 |
| JP | 2004-066558 A | 3/2004 |
| JP | 2004-526019 A | 8/2004 |
| JP | 2004-246397 A | 9/2004 |
| JP | 2004-276397 A | 10/2004 |
| JP | 2004-277585 A | 10/2004 |
| JP | 2004-314352 A | 11/2004 |
| JP | 2005-120310 A | 5/2005 |
| JP | 2005-194500 A | 7/2005 |
| JP | 2005-225955 A | 8/2005 |
| JP | 2005-225958 A | 8/2005 |
| JP | 2005-248178 A | 9/2005 |
| JP | 2005-255959 A | 9/2005 |
| JP | 2005-298813 A | 10/2005 |
| JP | 2005-314546 A | 11/2005 |
| JP | 2006-104244 A | 4/2006 |
| JP | 3829993 B | 7/2006 |
| JP | 2006-249335 A | 9/2006 |
| JP | 2006-249429 A | 9/2006 |
| JP | 2006-282802 A | 10/2006 |
| JP | 2006-282810 A | 10/2006 |
| JP | 2006-307137 A | 11/2006 |
| JP | 2006-328140 A | 12/2006 |
| JP | 2006-336001 A | 12/2006 |
| JP | 2007-146127 A | 6/2007 |
| JP | 2007-186641 A | 7/2007 |
| JP | 2007-277342 A | 10/2007 |
| JP | 2007-297595 A | 11/2007 |
| JP | 2007-297596 A | 11/2008 |
| JP | 2009-209338 A | 9/2009 |
| JP | 2009-209339 A | 9/2009 |
| JP | 2009-209340 A | 9/2009 |
| JP | 2010-047723 A | 3/2010 |
| JP | 2010-065119 A | 3/2010 |
| JP | 2010-195857 A | 9/2010 |
| WO | 99-05230 | 2/1999 |
| WO | 02-100959 A1 | 12/2002 |
| WO | 2004-39900 A1 | 5/2004 |
| WO | 2006-004001 A1 | 1/2006 |

| | | |
|---|---|---|
| WO | 2007-058245 A | 5/2007 |
| WO | 2007-116868 A1 | 10/2007 |
| WO | 2008-143086 A1 | 11/2008 |

OTHER PUBLICATIONS

Patent English Abstract of Japanese Application 2003-266913A Published Sep. 25, 2003.
Patent English Abstract of Japanese Application 2000-355667A Published Dec. 26, 2000.
Patent English Abstract of Japanese 2005-314546A Published Nov. 10, 2005.
Patent English Abstract of Japanese 2006-336001A Published Dec. 14, 2006.
Computer-Generated Translation of Japanese 08-123017A Published May 15, 1996.
Patent English Abstract of Japanese 11-166128A Published Jun. 22, 1999.
Patent English Abstract of Japanese 2003-268275A Published Sep. 25, 2003.
Computer-Generated Translation of Japanese 2004-314352A Published Nov. 11, 2004.
Computer-Generated Translation of Japanese 2005-225955A Published Aug. 25, 2005.
Computer-Generated Translation of Japanese 2005-225958A Published Aug. 25, 2005.
Patent English Abstract of Japanese Application 10-123760A Published May 15, 1998.
Computer-Generated Translation of Japanese Application 10-219166A Published Aug. 18, 1998.
Computer-Generated Translation of Japanese Application 10-330640A Published Dec. 15, 1998.
Computer-Generated Translation of Japanese Application 11-005230A Published Jan. 12, 1999.
Patent English Abstract of Japanese Application 2000-351928A Published Dec. 19, 2000.
Computer-Generated Translation of Japanese Application 2002-100959A Published Apr. 5, 2002.
Computer-Generated Translation of Japanese Application 2003-123760A Published Apr. 25, 2003.
Patent English Abstract of Japanese Application 2003-160750A Published Jun. 6, 2003.
Computer-Generated Translation of Japanese Application 2003-313480A Published Nov. 6, 2003.
Computer-Generated Translation of Japanese Application 2004-051881A Published Feb. 19, 2004.
Computer-Generated Translation of Japanese Application 2004-066558A Published Mar. 4, 2004.
Patent English Abstract of Japanese Application 2004-246397A Published Sep. 2, 2004.
Computer-Generated Translation of Japanese Application 2004-276397A Published Oct. 7, 2004.
Computer-Generated Translation of Japanese Application 2004-277585A Published Oct. 7, 2004.
English Patent Abstract of Japanese Application 2007-146127 Published Jun. 14, 2007.
Patent English Abstract of Japanese Application 2005-120310A Published May 12, 2005.
Computer-Generated Translation of Japanese Application 2005-255959A Published Sep. 22, 2005.
Computer-Generated Translation of Japanese Application 2006-282802A Published Oct. 19, 2006.
Printout of Search in Registry Files of STN for Pigment Blue 15:6; 2 pages.
Patent English Abstract of Japanese Application 2005-248178A Published Sep. 15, 2005.
Patent English Abstract of Japanese Application 2006-307137A Published Nov. 9, 2006.
Computer-Generated Translation of Japanese Application 2003-012583A Published Jan. 15, 2003.
Computer-Generated Translation of Japanese Application 2003-213179A Published Jul. 30, 2003.
Computer-Generated Translation of Japanese Application 2003-253167A Published Sep. 10, 2003.
Computer-Generated Translation of Japanese Application 2005-194500A Published Jul. 21, 2005.
Patent English Abstract of Japanese Application 2005-298813A Published Oct. 27, 2005.
Patent English Abstract of Japanese Application 2006-104244A Published Apr. 20, 2006.
Patent English Abstract of Japanese Application 2007-297596A Published Nov. 15, 2006.
Computer-Generated Translation of Japanese 2006-249335A Published Sep. 21, 2006.
Patent English Abstract of Japanese Application 2001-106951A Published Apr. 17, 2001.
Patent English Abstract of Japanese Application 2002-030230A Published Jan. 31, 2002.
Patent English Abstract of Japanese Application 2003-292835A Published Oct. 15, 2003.
Patent English Abstract of Japanese Application 2006-328140A Published Dec. 17, 2006.
Patent English Abstract of Japanese Application 2004-526019A Published Aug. 26, 2004.
Patent English Abstract of Japanese Application 2006-249429A Published Sep. 21, 2006.
Patent English Abstract of Japanese Application 2007-277342A Published Oct. 25, 2007.
Patent English Abstract of Japanese Application 2009-209338A Published Sep. 17, 2009.
Patent English Abstract of Japanese Application 2009-209339A Published Sep. 17, 2009.
Patent English Abstract of Japanese Application 2009-209340A Published Sep.17, 2009.
Patent English Abstract of Japanese Application 2010-047723A Published Mar. 4, 2010.
Patent English Abstract of Japanese Application 2010-065119A Published Mar. 25, 2010.
Patent English Abstract of Japanese Application 2010-195857A Published Sep. 9, 2010.
Japan Hardcopy '99 pp. 291-294.
Office Action Issued on July 23, 2009 in U.S. Appl. No. 10/572,738.
Final Office Action Issued on Feb. 4, 2010 in U.S. Appl. No. 10/572,738.
Office Action Issued on Aug. 17, 2010 in U.S. Appl. No. 12/085,141.
Search Report Issued on Mar. 17, 2011 in European Patent Application 07740853.2.
Office Action Issued on Jan. 14, 2008 in U.S. Appl. No. 11/732,082.
Office Action Issued on Apr. 3, 2008 in U.S. Appl. No. 11/732,113.
International Preliminary Report on Patentability Issued on Nov. 24, 2009 in Patent Application PCT/JP2008/058848.
Search Report Issued on Sep. 18, 2008 in European Patent Application 08011532.2.
Office Action Issued on Oct. 28, 2009 in U.S. Appl. No. 12/539,084.
Final Office Action Issued on Sep. 1, 2010 in U.S. Appl. No. 12/539,084.
Office Action Issued on Jun. 15, 2010 in U.S. Appl. No. 12/545,944.
Final Office Action Issued on Nov. 8, 2010 in U.S. Appl. No. 12/545,944.
English Abstract of Japanese Application No. 11-049998 Published Feb. 23, 1999.
English Abstract of Japanese Application No. 2000-319534 A Published Nov. 21, 2000.
English Abstract of Japanese Application No. 2003-253150 A Published Sep. 10, 2003.
English Abstract of Japanese Application No. 2006-282810 A Published Oct. 19, 2006.
English Abstract of Japanese Application No. 2007-186641 A Published Jul. 26, 2006.

\* cited by examiner

GAMUT AT L* = 20

- - - P.B.15:3+P.V.19
-·-·- P.B.60+P.V.19
——— P.B.15:6+P.V.19

GAMUT AT L* = 20

- - - P.B.15:3+VM
-·-·- P.B.60+VM
——— P.B.15:6+VM

INK SET, RECORDING APPARATUS, AND RECORDING METHOD

BACKGROUND

1. Technical Field

The present invention relates to an ink set with an extended color reproduction range (gamut), and particularly to an ink set having an extended color reproduction range in a blue region of a dark portion and excellent color reproducibility in other color regions. Also, the present invention relates to a recording apparatus and recording method using the ink set.

2. Related Art

A CIE/L*a*b* color system is known as a color model. According to the CIE/L*a*b*, all colors (spectra) in a visible light region which can be observed by the human eye can be indicated by chromaticity coordinates.

Among the three parameters (L*, a*, b*) of the CIE/L*a*b* color system, L* represents luminance (brightness) and a* and b* represent chromaticity showing hue and saturation. When L*=0, a black color is indicated, and when L*=100, a white color is indicated. In addition, a* represents a position between red and green colors, and negative value and positive value indicate green and red, respectively. Further, b* represents a position between yellow and blue colors, and negative value and positive value indicate blue and yellow, respectively. Since the L*a*b* color model is tree-dimensional, a color space is expressed by a three-dimensional space in which luminance is represented on the vertical axis.

However, the L*a*b* color model is merely an index used for conceptually explaining a color space, and the color reproduction range is limited. Namely, for example, when an image is formed on a recording medium using a pigment-based ink or ink set, a color which cannot be reproduced by a color of the L*a*b* color model is present.

On the other hand, ink compositions containing various pigments with high color development have been proposed. Japanese Unexamined Patent Application Publication No. 2006-282810 discloses that an ink having high color development and excellent ejection stability, storage stability, and ink reliability for clogging and the like is prepared using an ink composition containing a quinacridone solid solution pigment, a polyether-modified polydimethylsiloxane compound, and water. In addition, Japanese Unexamined Patent Application Publication No. 2007-186641 discloses that an ink having excellent printability, ejection stability, storage stability, and ink reliability for clogging and the like is realized using an ink composition containing a surface-treated pigment (yellow, magenta, cyan) including hydrophilic dispersive groups bonded to the surfaces of a solid-solution pigment composed of two or more specified pigments, a water-insoluble vinyl polymer, and water.

However, in particular, in a blue region of a dark portion having a L* value of 20 or less, color reproduction is limited. That is, when luminance is low, chromaticity and saturation are not easily expressed, and thus, for example, a color with an L* value of 20 or less, an a* value of 30 or more, and a b* value of −75 or less, such as (L*, a*, b*)=(19.4, 30.0, −72.6) or (L*, a*, b*)=(19.4, 37.6, −76.8) in the CIE/L*a*b* color system, cannot be reproduced on an image recording medium using droplets (ink). Therefore, the inventors intensively studied in order to extend a color reproduction range in a blue region of a dark portion. As a result, the inventors have proposed in Japanese Patent Application No. 2008-215056 as prior application that the color reproduction range in a blue region of a dark portion with a L* value of 20 or less can be extended by an ink set including a combination of a cyan ink composition containing C. I. Pigment Blue 15:6 or C. I. Pigment Blue 60 as a pigment and a magenta ink composition containing a quinacridone pigment. In particular, it has been proposed that a color with a L* value of 20 or less, an a* value of 30 or more, and a b value of −75 or less, which has so far been impossible to reproduce, can be realized by an ink set including a combination of a cyan ink composition containing C. I. Pigment Blue 15:6 as a pigment and a magenta ink composition containing a quinacridone solid solution pigment.

On the other hand, with respect to an ink set, generally, a blue region color is reproduced by mixing a cyan ink composition and a magenta ink composition, a red region color is reproduced by mixing a yellow ink composition and a magenta ink composition, and a green region color is reproduced by mixing a yellow ink composition and a cyan ink composition. Therefore, when the color reproduction range in a blue region is extended, it is necessary to take account of color reproducibility in a green region which is reproduced by a cyan ink composition and a yellow ink composition and in a red region which is reproduced by a yellow ink composition and a magenta ink composition. Namely, it is necessary to simultaneously satisfy the color reproduction ranges in the blue region and the other color regions. On the other hand, the inventors have found that although C. I. Pigment Blue 60 contained in a cyan ink composition is an effective pigment type for enlarging the reproduction range in the blue region of a dark portion, the pigment significantly decreases the color development in the green region. Therefore, it has been proposed in Japanese Patent Application No. 2008-232165 that reproducibility in both the blue region and the green region can be realized by an ink set including a combination of a cyan ink composition containing C. I. Pigment Blue 15:6 as a pigment, a magenta ink composition containing a quinacridone pigment selected from the group consisting of C. I. Pigment Violet 19, C. I. Pigment Red 122, C. I. Pigment Red 202, and C. I. Pigment Red 209 or a quinacridone solid solution pigment composed of at least two selected from the group, and a yellow ink composition containing a pigment selected from the group consisting of C. I. Pigment Yellow 74, C. I. Pigment Yellow 213, and C. I. Pigment Yellow 185.

However, the inventors have recently found that C. I. Pigment Blue 15:6 contained as a pigment in a cyan ink composition has poor graininess for recoding an image in a high-brightness region. An ink set is generally composed of a cyan ink composition, a magenta ink composition, a yellow ink composition, a light cyan ink composition, and a light magenta ink composition. In order to improve gradation and graininess, an ink composition (light ink composition) at a lower pigment concentration among the similar color ink compositions in the ink set is used for recording an image in a high-brightness region. However, it has been found that a problem with graininess, such as noticeable dots or the like, occurs in a high-brightness cyan region and green region in which an image is recorded using a light cyan composition containing C. I. Pigment Blue 15:6 as a pigment.

SUMMARY

An advantage of some aspects of the invention is that the invention provides an ink set having an enlarged color reproduction range (gamut) and excellent graininess in a high-brightness region.

Another advantage of some aspects of the invention is that the invention provides a recording method and a recording apparatus using the ink set.

The present invention has been achieved on the basis of the above-described findings and is as follows.

(1) An ink set including:
a cyan ink composition containing C. I. Pigment Blue 15:6 as a pigment;
a magenta ink composition containing a quinacridone pigment selected from the group consisting of C. I. Pigment Violet 19, C. I. Pigment Red 122, C. I. Pigment Red 202, and C. I. Pigment Red 209 or a quinacridone solid solution pigment composed of at least two selected from the group;
a yellow ink composition containing a pigment selected from the group consisting of C. I. Pigment Yellow 74, C. I. Pigment Yellow 213, and C. I. Pigment Yellow 185;
a light magenta ink composition containing a quinacridone pigment selected from the group consisting of C. I. Pigment Violet 19, C. I. Pigment Red 122, C. I. Pigment Red 202, and C. I. Pigment Red 209 or a quinacridone solid solution pigment composed of at least two selected from the group at a pigment concentration lower than that of the magenta ink composition; and
a light cyan ink composition containing C. I. Pigment Blue 15:3 as a pigment at a pigment concentration lower than that of the cyan ink composition.

(2) The ink set described above in (1), wherein the pigment contained in at least one of the magenta ink composition and the light magenta ink composition is a quinacridone solid solution pigment composed of at least two selected from the group consisting of C. I. Pigment Violet 19, C. I. Pigment Red 122, C. I. Pigment Red 202, and C. I. Pigment Red 209.

(3) The ink set described above in (2), wherein the pigment contained in at least any one of the magenta ink composition and the light magenta ink composition is a quinacridone solid solution pigment composed of C. I. Pigment Violet 19 and C. I. Pigment Red 202.

(4) The ink set described above in (3), wherein in the quinacridone solid solution pigment, the mass of C. I. Pigment Violet 19 is larger than the mass of C. I. Pigment Red 202.

(5) The ink set described above in (3) or (4), wherein in the quinacridone solid solution pigment, the mass ratio of C. I. Pigment Violet 19/C. I. Pigment Red 202 is 70/30 to 50/50.

(6) The ink set described above in any one of the terms (1) to (5), wherein C. I. Pigment Violet 19 contained in the quinacridone solid solution pigment is γ-type.

(7) The ink set described above in any one of the terms (1) to (6), wherein the pigment concentration of each of the light magenta ink composition and the light cyan ink composition is 2% by mass or less.

(8) The ink set described above in any one of the terms (1) to (7), including the cyan ink composition, the magenta ink composition, the yellow ink composition, the light magenta ink composition, the light cyan ink composition, and a black ink composition.

(9) A recording apparatus including the ink set described above in any one of the terms (1) to (8).

(10) A recording method using the ink set described above in any one of the terms (1) to (8).

A ink set according to the present invention includes a light cyan ink composition used for recording images in a high-brightness region, the pigment type used in the light cyan ink composition being different from that in a cyan ink composition of a higher concentration than the light cyan ink composition. Namely, the light cyan ink composition uses C. I. Pigment Blue 15:3 of a pigment type different from C. I. Pigment Blue 15:6 which is a pigment type of the cyan ink composition. The configuration permits the formation of a high-quality image with excellent graininess in a high-brightness cyan region and green region where an image is recorded with a light cyan ink composition.

Therefore, the ink set according to the present invention can reproduce a color in a dark portion blue region having an L* value of 20 or less, an a* value of 30 or more, and a b* value of −75 or less according to CIE standards, which has so far been impossible to reproduce. Also, the ink set has excellent color reproducibility in a green region and can form a high-quality image with excellent graininess even in a high-brightness cyan region and green region.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
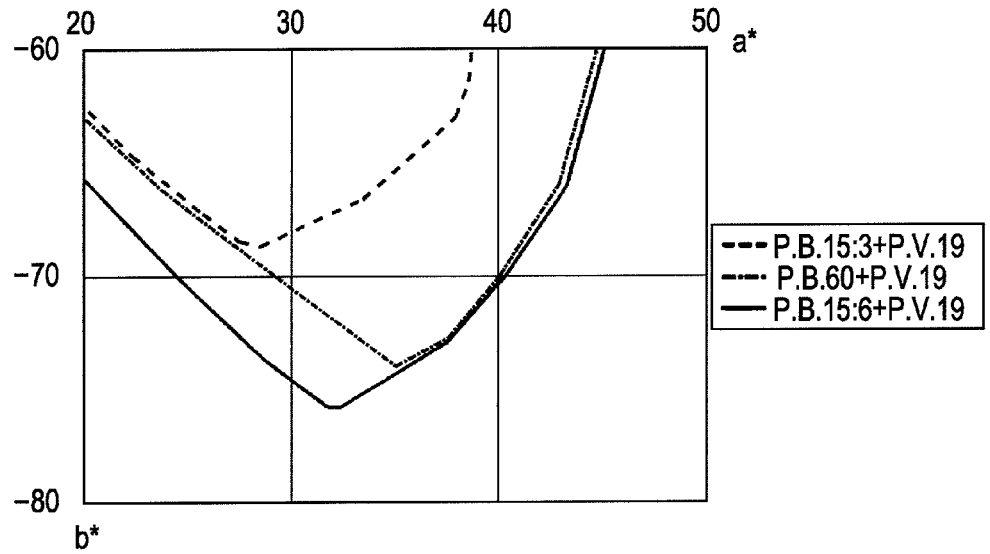
FIG. 1 is a drawing showing gamuts at L*=20 of ink sets of Example 1 and Comparative Examples 1 and 2.

A cyan ink composition, a magenta ink composition, a yellow ink composition, a light cyan ink composition, and a light magenta ink composition which constitute an ink set according to the present invention are described in detail below.

1. Pigment

In the present invention, commercially available C. I. Pigment Blue 15:6 (hereinafter, abbreviated as "P. B. 15:6") can be used in a cyan ink composition.

Also, commercially available C. I. Pigment Violet 19 (hereinafter, abbreviated as "P. V. 19"), C. I. Pigment Red 122 (hereinafter, abbreviated as "P. R. 122"), C. I. Pigment Red 202 (hereinafter, abbreviated as "P. R. 202"), and C. I. Pigment Red 209 (hereinafter, abbreviated as "P. R. 209") can be used as quinacridone pigments in a magenta ink composition and a light magenta ink composition.

In the present invention, a quinacridone solid solution pigment is composed of at least two selected from the group consisting of P. V. 19 (in a solid solution, γ-type P. V. 19 is preferred from the viewpoint of color development), P. R. 122, P. R. 202, and P. R. 209.

A combination of two or more quinacridone compounds is not particularly limited. However, in the present invention, a solid solution pigment including a combination of P. V. 19 and P. R. 209, a combination of P. V. 19 and P. R. 122, or a combination of P. V. 19 and P. R. 202 is preferred from the viewpoint of color development. In particular, a solid solution pigment including a combination of P. V. 19 and P. R. 202 is preferred.

The mixing ratio of P. V. 19 and P. R. 209 in the solid solution pigment is preferably P. V. 19:P. R. 209 in a range of 10:90 to 90:10, more preferably in a range of 15:85 to 85:15, and particularly preferably in a range of 30:70 to 50:50. In addition, P. V. 19:P. R. 122 is preferably in a range of 10:90 to 90:10, more preferably in a range of 15:85 to 85:15, and particularly preferably in a range of 30:70 to 50:50. Further, P. V. 19:P. R. 202 is preferably in a range of 10:90 to 90:10, more preferably in a range of 15:85 to 85:15, and particularly preferably in a range of 30:70 to 50:50. When a quinacridone pigment is formed in the solid solution pigment, it is possible to form a magenta ink composition and a light magenta ink composition having excellent color reproducibility in a red region with high coloration and high brightness and excellent color reproducibility in a violet region. In particular, a solid solution pigment including P. V. 19 and P. R. 202 in which the mass of P. V. 19 is larger than the mass of P. R. 202 is excellent in color reproducibility in a red region with high coloration and high brightness and excellent in color reproducibility in a violet region.

The method for producing the quinacridone solid solution pigment is not particularly limited, and a known production method can be used. Specifically, the methods disclosed in Japanese Unexamined Patent Application Publication Nos. 11-49998, 2000-319534, and 2003-253150 can be used. In addition, in the present invention, the quinacridone solid solution pigment represents a pigment which is present as a mixed crystal (crystallized in a mixed state) of a plurality of quinacridone pigment molecules and is different from a simple mixture of two or more quinacridone pigments.

In addition, whether or not a solid solution pigment composed of two or more quinacridone pigments can be easily confirmed by X-ray diffraction analysis. In case of a simple mixture of two types of quinacridone pigments, an X-ray diffraction pattern thereof corresponds to overlap of the X-ray diffraction patterns of respective pigments, and the peak intensity is proportional to the mixing ratio. On the other hand, when a quinacridone solid solution pigment is formed, a diffraction pattern peculiar to a newly formed crystal is observed.

In the present invention, the average particle diameter of the quinacridone solid solution pigment is preferably in a range of 10 nm to 200 nm and more preferably in a range of 50 nm to 150 nm. When the average particle diameter is less than 10 nm, weather resistance may be decreased, while when the average particle diameter exceeds 200 nm, precipitation may occur, thereby failing to stably eject the ink.

In addition, commercially available C. I. Pigment Yellow 74 (hereinafter, abbreviated as "P. Y. 74"), C. I. Pigment Yellow 213 (hereinafter, abbreviated as "P. Y. 213"), and C. I. Pigment Yellow 185 (hereinafter, abbreviated as "P. Y. 185") can be used in a yellow ink composition.

Aldo, commercially available C. I. Pigment Blue 15:3 (hereinafter, abbreviated as "P. B. 15:3") can be used in a light cyan ink composition.

In the present invention, the pigment content in each of the cyan ink composition, the magenta ink composition, and the yellow ink composition is preferably 0.1 to 15% by mass from the viewpoint of ejection stability, storage stability, ink reliability such as clogging, and the like.

In the present invention, each of the light cyan ink composition and the light magenta ink composition is an ink composition having a lower pigment concentration than that of the ink composition of a similar color and preferably has a pigment concentration of 2% by mass or less, more preferably 1.5 to 0.3% by mass, from the viewpoint of gradation and graininess.

2. Components Other than Pigment

Although components other than the pigment contained in each of the ink composition of the present invention are not particularly limited, the components below are preferably contained.

A dispersant is not particularly limited, and any dispersant which can be used for pigment inks can be used. For example, a cationic dispersant, an anionic dispersant, a nonionic dispersant, a surfactant, and the like can be used.

Examples of the anionic dispersant include polyacrylic acid, polymethacrylic acid, acrylic acid-acrylonitrile copolymers, vinyl acetate-acrylic acid ester copolymers, acrylic acid-acrylic acid alkyl ester copolymers, styrene-acrylic acid copolymers, styrene-methacrylic acid copolymers, styrene-acrylic acid-acrylic acid alkyl ester copolymers, styrene-methacrylic acid-acrylic acid alkyl ester copolymers, styrene-α-methylstyrene-acrylic acid copolymers, styrene-α-methylstyrene-acrylic acid-acrylic acid alkyl ester copolymers, styrene-maleic acid copolymers, vinylnaphthalene-maleic acid copolymers, vinyl acetate-ethylene copolymers, vinyl acetate-fatty acid vinyl ethylene copolymers, vinyl acetate-maleic acid ester copolymers, vinyl acetate-crotonic acid copolymers, vinyl acetate-acrylic acid copolymers, and the like. Examples of the nonionic dispersant include polyvinyl pyrrolidone, polypropylene glycol, vinyl pyrrolidone-vinyl acetate copolymers, and the like. Examples of the surfactant serving as the dispersant include anionic surfactants such as sodium dodecylbenzenesulfonate, sodium laurate, ammonium salts of polyoxyethylene alkyl ether sulfate, and the like; and nonionic surfactants such as polyoxyethylene alkyl ethers, polyoxyethylene alkyl esters, polyoxyethylene sorbitan fatty acid esters, polyoxyethylene alkyl phenyl ethers, polyoxyethylene alkylamines, polyoxyethylene alkylamides, and the like. In particular, styrene-(meth) acrylic acid copolymers are preferably used from the viewpoint of enhancing dispersion stability of pigments. As described in Japanese Unexamined Patent Application Publication No. 2007-186641, a water-insoluble vinyl polymer and the like which impart fixability and glossiness may be used as the dispersant.

In the present invention, each of the ink compositions preferably contains as a wetting agent at least one of polyhydric alcohols having, saccharides, and polyhydric alcohols having ethylene oxide chains. By adding the wetting agent, an ink is prevented from being dried when used for ink jet recording, thereby suppressing clogging in a head of an ink jet printer.

Examples of the wetting agent include polyhydric alcohols, such as ethylene glycol, diethylene glycol, triethylene glycol, polyethylene glycol, polypropylene glycol, propylene glycol, butylene glycol, 1,2,6-hexanetriol, thioglycol, hexylene glycol, glycerin, trimethylolethane, trimethylolpropane, and the like; saccharides such as sugar alcohol and the like; polyhydric alcohols having ethylene oxide chains, such as ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether triethylene glycol monobutyl ether, and the like. At least one of these compounds is used.

In the present invention, each of the ink compositions preferably contains as a penetrant at least one of pyrrolidones, alkanediols, and glycol ethers. By adding the penetrant, wettability of a recording medium can be enhanced to improve penetrability of ink. Examples of the penetrant include pyrrolidones such as 2-pyrrolidone, N-methyl-2-pyrrolidone, and the like; alkanediols, such as 1,2-pentanediol, 1,2-hexanediol, and the like; and glycol ethers, such as ethylene glycol monomethyl ether, diethylene glycol monoethyl ether, diethylene glycol monobutyl ether, triethylene glycol monobutyl ether, propylene glycol monobutyl ether, dipropylene glycol monobutyl ether, and the like. At least one of these compounds is preferably used.

In the present invention, each of the ink compositions preferably contains as a surfactant at least one compound selected from the group consisting of acetylene glycols and polysiloxanes. By adding the surfactant, wettability of a recording medium can be enhanced to improve penetrability of ink.

In the present invention, each of the ink compositions may contain a low-boiling-point organic solvent from the viewpoint of shortening the ink drying time. Examples of the low-boiling-point organic solvent include methanol, ethanol, n-propyl alcohol, iso-propyl alcohol, n-butanol, sec-butanol, tert-butanol, iso-butanol, n-pentanol, and the like, and at least one of these solvents is used. In particular, a monohydric alcohol is preferred.

In the present invention, each of the ink compositions preferably contains the above-described pigment, dispersant, wetting agent, low-boiling-point organic solvent, penetrant, surfactant, and the like, and contains water as a balance. As water, pure water or ultrapure water, such as ion exchanged water, ultrafiltered water, Milli-Q water, distilled water, or the like, is preferably used. Such water which is sterilized by ultraviolet irradiation, adding hydrogen peroxide, or the like is preferred because the occurrence of mold or bacteria is prevented over a long period of time.

In the present invention, according to demand, each of the ink compositions may contain additives, such as a fixing agent such as water-soluble rosin or the like, an anti-scattering agent/antiseptic agent such as sodium benzoate or the like, an antioxidant/ultraviolet absorber such as allophanate or the like, a chelating agent, an oxygen absorber, a pH adjuster, and the like, and at least one of these additives is used.

3. Ink Set

The ink set of the present invention includes at least the yellow ink composition, the magenta ink composition, the cyan ink composition, the light cyan ink composition, the light magenta ink composition, and a black ink composition from the viewpoint of achieving color reproducibility in a wide range.

When the ink set of the present invention includes the black ink composition, a colorant thereof is not particularly limited. However, as the colorant contained in the black ink composition, carbon black (C. I. Pigment Black 7) such as furnace black, lamp black, acetylene black, channel black, or the like, a metal compound such as copper oxide, iron oxide (C. I. Pigment Black 11), or the like, or an organic pigment such as aniline black (C. I. Pigment Black 1) or the like can be used. However, carbon black which has relatively low specific gravity and little precipitates in water is preferred for ink jet. These may be used alone or as a mixture of two. Examples of carbon black as a pigment include No. 2300, No. 900, MCF88, No. 33, No. 40, No. 45, No. 52, MA7, MA8, MA100, No. 2200B, and the like which are manufactured by Mitsubishi Chemical Corporation; Raven 5750, 5250, 5000, 3500, 1255, and 700, and the like which are manufactured by Columbia Chemical Co.; Regal 400R, 330R, and 660R, Mogul L and 700, Monarch 800, 880, 900, 1000, 1100, 1300, and 1400, and the like which are manufactured by Cabot Corporation; Color Black FW1, FW2, FW2V, FW18, and FW200, Color Black 5150, 5160, and 5170, Printex 35, U, V, and 140U, Special Black 6, 5, 4A, and 4, and the like which are manufactured by Degussa Co. The components of the black ink composition can be controlled by the same method as for the above-described other ink compositions and the like.

4. Recording Method and Recording Apparatus

Although application of the ink set of the present invention is not particularly limited, the ink set can be applied to various ink jet recording systems. Examples of the ink jet recording systems include thermal jet-type ink jet, piezo ink jet, continuous ink jet, roller application, spray application, and the like. Also, the ink set of the present invention can be applied to a recording apparatus and the like using such a recording system.

In the present invention, as a recording medium to which droplets of the ink set according to the present invention are adhered, glossy paper for ink jet recording is preferably used. Here, the term "glossy paper" represents plain paper in which an ink receiving layer having excellent surface glossiness is formed by special coating. In general, there are cast glossy paper in which an ink receiving layer is formed by a cast method to impart glossiness to a surface, and polymer-coated glossy paper in which an ink jet recording layer composed of a resin as a main component is formed. As other polymer-coated glossy paper, a recording medium using an electron beam-curable resin can be used.

EXAMPLES

Although the present invention is described in detail below with reference to examples, the present invention is not limited to these examples.

1. Preparation of various ink compositions (C1, C2, C3, M1, M2, Y1, LC1, LC2, LM1, K1)

As shown in Table 1 below, each of cyan ink compositions (C1, C2, C3), magenta ink compositions (M1, M2), a yellow ink composition (Y1), light cyan ink compositions (LC1, LC2), a light magenta ink compositions (LM1), and a black ink composition (K1) was prepared. In Table 1, the amount of each composition added is shown by % by mass. In addition, the dispersant used in Table 1 is a styrene-acrylic copolymer, and the surfactant is BYK-348 manufactured by BYK Chemie Japan.

Further, as a quinacridone solid solution pigment contained in the magenta ink composition M2 and the light magenta ink composition LM1, a solid solution pigment containing γ-type P. V. 19 and P. R. 202 at a mass ratio of 70:30 was prepared. The resulting solid solution pigment showed a magenta color hue, but an X-ray diffraction pattern was different from a diffraction pattern of a mixture of γ-type P. V. 19 and P. R. 202.

TABLE 1

|  | C1 | C2 | C3 | M1 | M2 |
|---|---|---|---|---|---|
| Pigment | P. B. 15:3 4.0% | P. B. 60 4.0% | P. B. 15:6 4.0% | P. V. 19 5.0% | Solid solution (γ-P. V. 19/P. R. 202) 5.0% |
| Dispersant | 2.4% | 2.4% | 2.4% | 2.7% | 2.7% |
| Glycerin | 9.0% | 9.0% | 9.0% | 9.7% | 11.0% |
| 1,2-hexanediol | 5.0% | 5.0% | 5.0% | 2.5% | 2.5% |
| Triethanolamine | 0.9% | 0.9% | 0.9% | 0.9% | 0.9% |
| Surfactant | 0.5% | 0.5% | 0.5% | 0.8% | 0.8% |
| Ultrapure water | balance | balance | balance | balance | balance |
| Total | 100% | 100% | 100% | 100% | 100% |

TABLE 1-continued

|  | Y1 | LC2 | LC2 | LM1 | K1 |
|---|---|---|---|---|---|
| Pigment | P. B. 74 3.5% | P. B. 15:3 1.0% | P. B. 15:6 1.0% | Solid solution (γ-P. V. 19/P. R. 202) 1.0% | Carbon black 2.0% |
| Dispersant | 2.8% | 2.0% | 2.0% | 2.5% | 1.0% |
| Glycerin | 14.0% | 20.0% | 20.0% | 20.0% | 13.0% |
| 1,2-hexanediol | 5.0% | 5.0% | 5.0% | 2.5% | 8.0% |
| Triethanolamine | 0.9% | 0.9% | 0.9% | 0.9% | 0.9% |
| Surfactant | 0.5% | 0.5% | 0.5% | 0.8% | 0.3% |
| Ultrapure water | balance | balance | balance | balance | balance |
| Total | 100% | 100% | 100% | 100% | 100% |

2. Evaluation of Ink Set 2-1 Evaluation of Color Reproduction Range

Printing was performed using an ink jet printer ("PX-5500" manufactured by Seiko Epson Corporation). In the printer, a cyan ink cartridge (Model No. ICC37 manufactured by Seiko Epson Corporation), a magenta ink cartridge (Model No. ICM37 manufactured by Seiko Epson Corporation), a yellow ink cartridge (Model No. ICY37 manufactured by Seiko Epson Corporation), and a black ink cartridge (Model No. ICBK33 manufactured by Seiko Epson Corporation) were filled with respective ink compositions in each of the combinations shown in Table 2, and ink sets of examples and comparative examples were formed.

TABLE 2

|  | Ink set | | | |
|---|---|---|---|---|
|  | Cyan | Magenta | Yellow | Black |
| Comparative Example 1 | C1 | M1 | Y1 | K1 |
| Comparative Example 2 | C2 | M1 | Y1 | K1 |
| Example 1 | C3 | M1 | Y1 | K1 |
| Comparative Example 3 | C1 | M2 | Y1 | K1 |
| Comparative Example 4 | C2 | M2 | Y1 | K1 |
| Example 2 | C3 | M2 | Y1 | K1 |

The thus-prepared ink cartridges were mounted on the printer, and a printing test was conducted on photographic glossy paper ("Photopaper <Luster>" manufactured by Seiko Epson Corporation). In printing, a mixed color solid pattern with a duty or 85% or less was printed.

The black ink was used for finely controlling brightness.

In the specification, "duty" represents a value calculated according to the following equation.

Duty (%)=Number of actual printing dots/(longitudinal resolution×lateral resolution)×100

(In the equation, the number of actual printing dots is the number of actual printing dots per unit area, and longitudinal resolution and lateral resolution are each resolution per unit area. "100% duty" represents the maximum ink mass of a single color for a pixel.)

Figure 2:
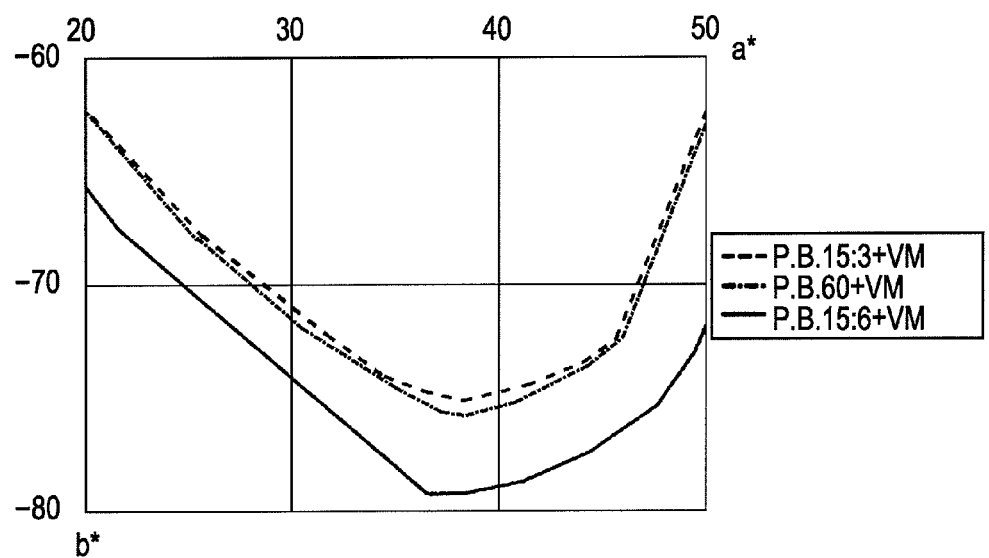
FIG. 2 is a drawing showing gamuts at L*=20 of ink sets of Example 2 and Comparative Examples 3 and 4.

The L*a*b* color system coordinates of the resulting prints based on the color difference display method defined in CIE were measured using a colorimeter (Spectrolino (manufactured by Gretag Macbeth Corp.) according to JIS Z8729. FIG. 1 shows gamuts at L*=20 of Example 1 and Comparative Examples 1 and 2, and FIG. 2 shows gamuts at L*=20 of Example 2 and Comparative Examples 3 and 4. In FIG. 2, "VM" represents the magenta ink M2.

FIG. 1 indicates that the color reproduction range in a blue region of a dark portion with a L* of 20 or less can be significantly enlarged by combining a cyan ink composition containing P. B. 15:6 or P. B. 60 as a pigment with a magenta ink composition containing a quinacridone pigment in comparison to use of a cyan ink composition containing P. B. 15:3 which has been used for various purposes. In addition, FIG. 2 shows that a color with an L* value of 20 or less, an a* value of 30 or more, and a b* value of −75 or less, which has been impossible to reproduce, can be realized by combining a cyan ink composition containing P. B. 15:6 as a pigment with a magenta ink composition containing a quinacridone solid solution pigment (VM) as a pigment.

Figure 3:
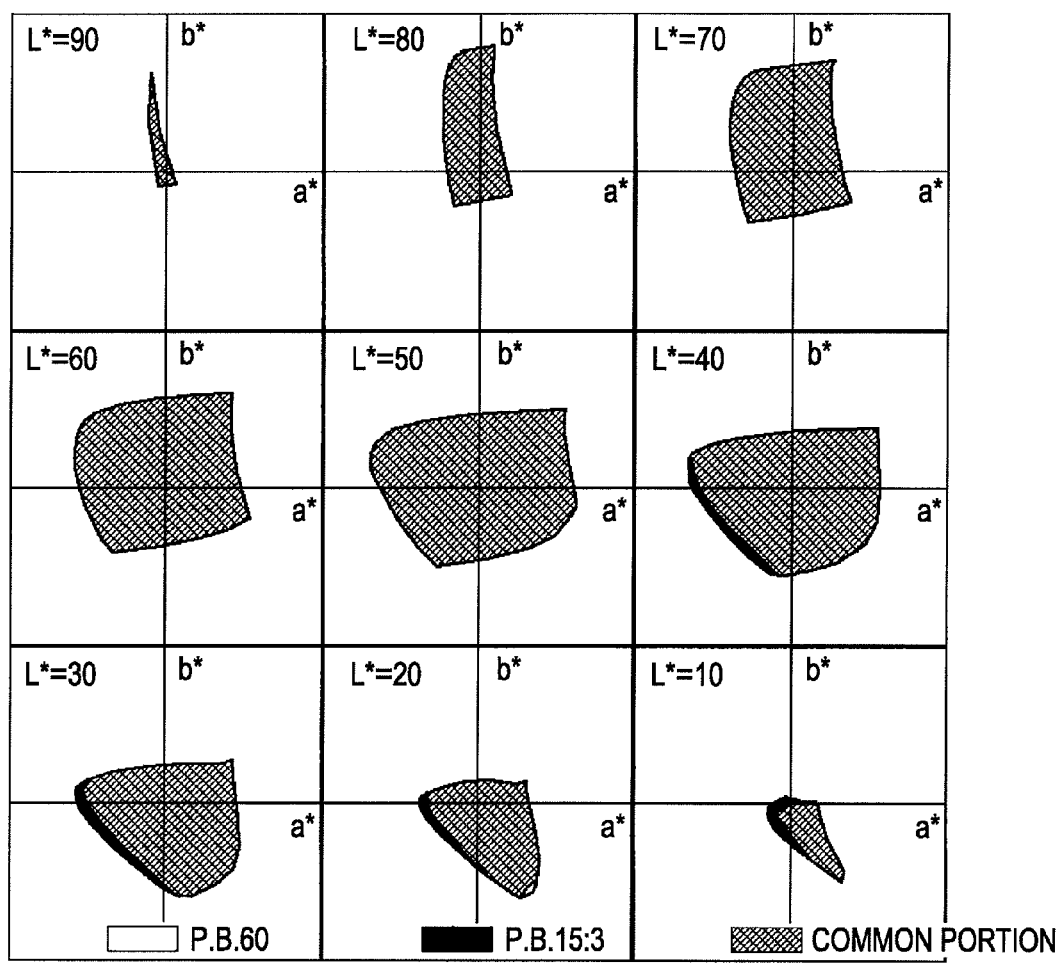
FIG. 3 is a drawing showing gamuts at L*=10 to 90 of, ink sets of Comparative Examples 3 and 4.
Figure 4:
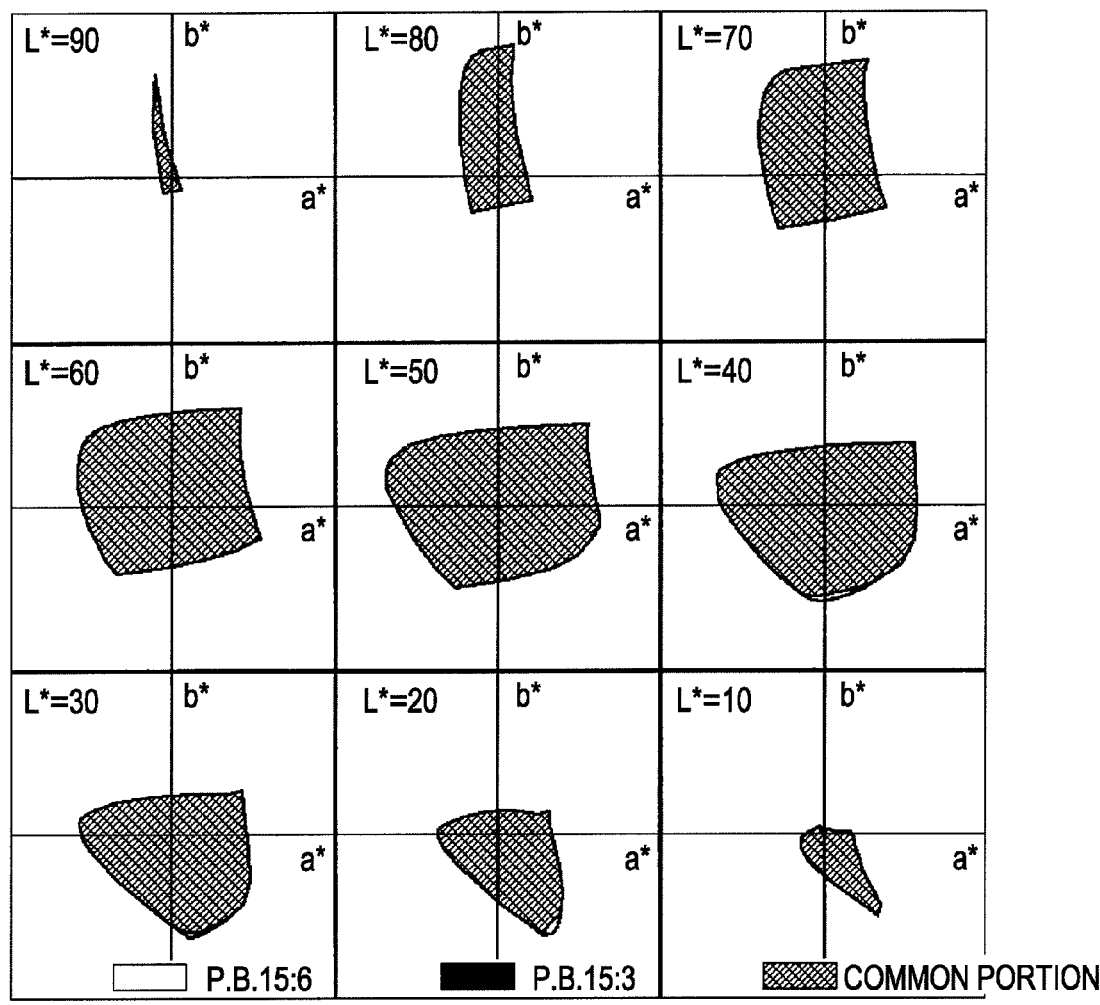
FIG. 4 is a drawing showing gamuts at L*=10 to 90 of ink sets of Example 2 and Comparative Example 3.
Figure 5:
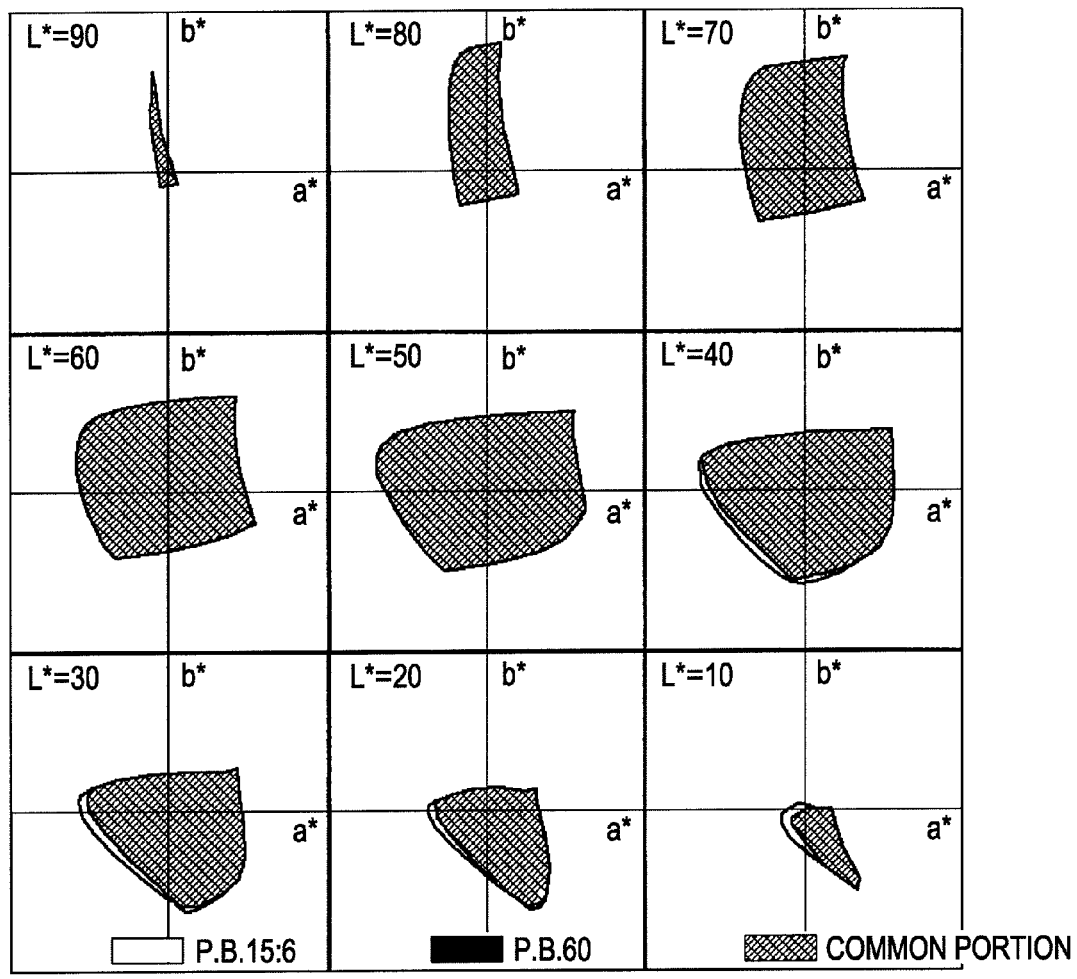
FIG. 5 is a drawing showing gamuts at L*=10 to 90 of ink sets of Example 2 and Comparative Example 4.

FIGS. 3, 4, and 5 show gamuts of ink sets of Example 2 and Comparative Examples 3 and 4. In FIGS. 3 to 5, a* indicates a position between red and green colors, and negative value and positive value represent green and red, respectively. Therefore, the more the negative a* value is, the wider the color reproduction range in a green region is. A color in the green region is reproduced by a cyan ink composition and a yellow ink composition (Y1) containing P. Y. 74 as a pigment.

In FIG. 3, the gamut of the ink set of Comparative Example 4 (ink set including the cyan ink composition containing P. B. 60) is shown in white, the gamut of the ink set of Comparative Example 3 (ink set including the cyan ink composition containing P. B. 15:3) is shown in black, and a common portion of both gamuts is shown by shading.

FIG. 3 indicates that in a blue region of a dark portion, color reproducibility of the ink set of Comparative Example 3 using P. B. 15:3 as a pigment is inferior to the ink set using P. B. 60 as a pigment (Comparative Example 4) (refer to FIGS. 1 and 2), while in a green region, the ink set of Comparative Example 3 shows good color reproducibility. For example, in a region with L* of 10 to 40, a black portion is wide within a region of negative a* values. Namely, it is shown that the ink set (Comparative Example 3) using P. B. 15:3 has wider color reproducibility in a green region as compared with the ink set (Comparative Example 4) using P. B. 60.

On the other hand, in FIG. 4, the gamut of the ink set of Example 2 (ink set including the cyan ink composition containing P. B. 15:6) is shown in white, the gamut of the ink set of Comparative Example 3 (ink set including the cyan ink composition containing P. B. 15:3) is shown in black, and a common portion of both gamuts is shown by shading.

FIG. 4 indicates that in a blue region of a dark portion, the ink set of Example 2 using P. B. 15:6 as a pigment has excellent color reproducibility and, in a green region, the ink set of Example 2 has wide color reproducibility equivalent to the ink set of Comparative Example 3 using P. B. 15:3 as a pigment.

In FIG. 5, the gamut of the ink set of Example 2 (ink set including the cyan ink composition containing P. B. 15:6) is shown in white, the gamut of the ink set of Comparative Example 4 (ink set including the cyan ink composition containing P. B. 60) is shown in black, and a common portion of both gamuts is shown by shading.

FIG. 5 indicates that in both the blue region and the green region, the ink set using P. B. 15:6 as a pigment has wider color reproducibility than that of the ink set using P. B. 60 as a pigment.

2-2 Evaluation of Graininess in High-Brightness Region

Next, printing was performed using an ink jet printer ("PX-5500" manufactured by Seiko Epson Corporation). In the printer, a cyan ink cartridge (Model No. ICC37 manufactured by Seiko Epson Corporation), a magenta ink cartridge (Model No. ICM37 manufactured by Seiko Epson Corporation), a yellow ink cartridge (Model No. ICY37 manufactured by Seiko Epson Corporation), a black ink cartridge (Model No. ICBK33 manufactured by Seiko Epson Corporation), a light cyan ink cartridge (Model No. ICLC37 manufactured by Seiko Epson Corporation), and a light magenta ink cartridge (Model No. ICLM37 manufactured by Seiko Epson Corporation) were filled with respective ink compositions in each of the combinations shown in Table 3, and ink sets of an example and a comparative example were formed.

TABLE 3

| | Ink set | | | | | |
|---|---|---|---|---|---|---|
| | Cyan | Magenta | Yellow | Light cyan | Light magenta | Black |
| Comparative Example 5 | C3 | M1 | Y1 | LC2 | LM1 | K1 |
| Example 3 | C3 | M1 | Y1 | LC1 | LM1 | K1 |

The thus-prepared ink cartridges were mounted on the printer, and a gradation patch including 14 evaluation images with L* values of 50 to 95 of green and cyan colors was printed on photographic glossy paper ("Photopaper <Luster>" manufactured by Seiko Epson Corporation). The resulting print was taken in as electron data by a scanner ("GT-X770" manufactured by Seiko Epson Corporation), and graininess index values were calculated with a dedicated software. In addition, the scan resolution was 1200 dpi, and an analysis region was 256×256 pixels.

Figure 6:
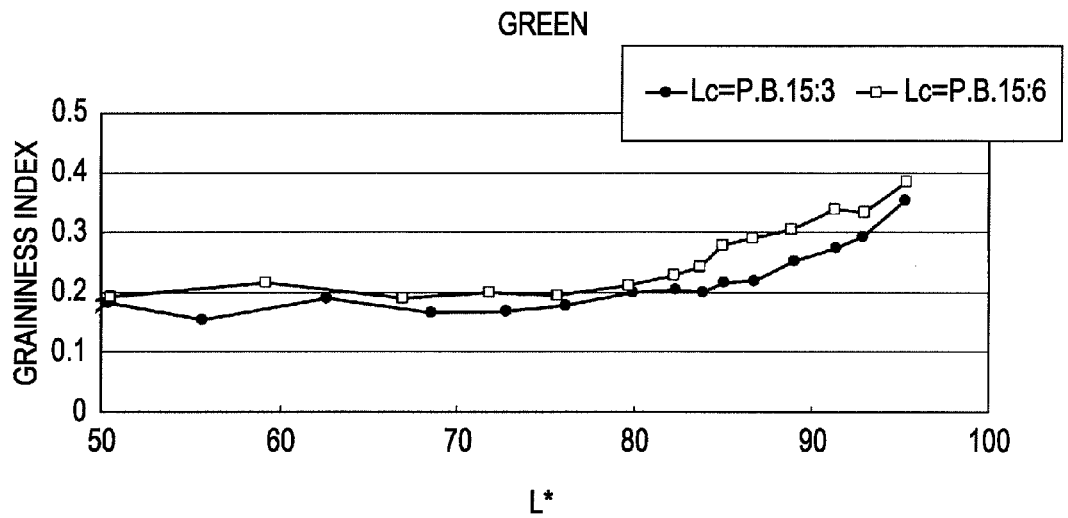
FIG. 6 is a chart showing graininess in green regions of ink sets of Example 3 and Comparative Example 5.
Figure 7:
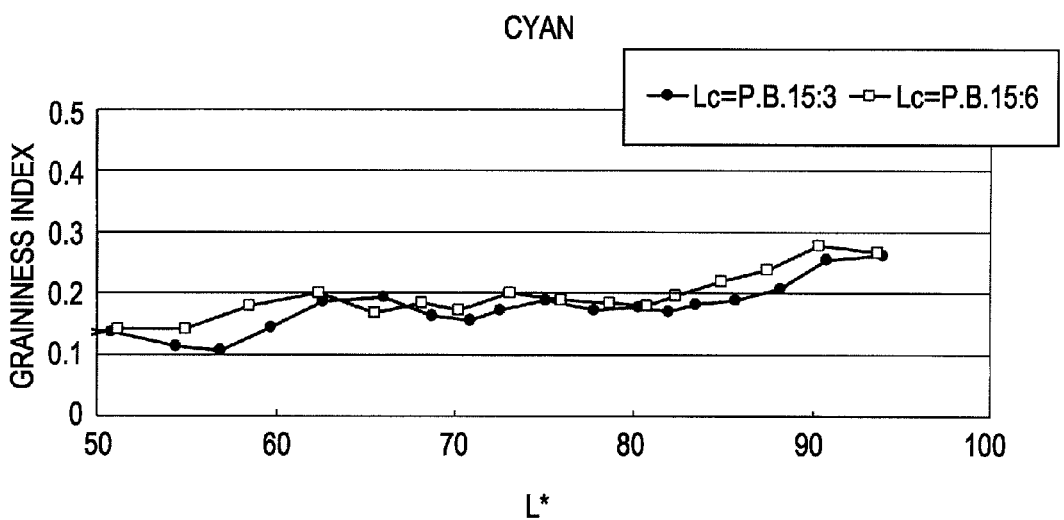
FIG. 7 is a chart showing graininess in cyan regions of ink sets of Example 3 and Comparative Example 5.

FIG. 6 is a chart showing the results of evaluation of graininess of 14 types of evaluation images in the green region. Also, FIG. 7 is a chart showing the results of evaluation of graininess of 14 types of evaluation images in the cyan region.

The graininess was evaluated using the dedicated software on the basis of graininess index value GF shown by equation 1 below. In the equation, u is a spatial frequency, WS(u) is a Wiener spectrum of an image, VTF(u) is visual sensitivity characteristic with respect to the spatial frequency, and L is an observation distance (300 mm). In addition, $(L^*+16/116)^{0.8}$ is a factor for adjusting the index value to the human visual characteristics.

$$GF=(L^*+16/116)^{0.8}\int WS(u)^{0.5} \cdot VTF(u)du \quad \text{Equation 1}$$

wherein $$VTF(u)=5.05\exp(-0.318\pi Lu/180)[1-\exp(-0.1\pi Lu/180)]$$

Here, the meaning of equation 1 is briefly described. WS(u) is considered to indicate the periodicity of an image. For example, considering an image in which a large filled circle pattern is repeatedly printed, large peaks appear, in a WS(u) spectrum of the image, at spatial frequency u1 corresponding to the diameter of the filled circles and spatial frequency u2 corresponding to the repetition period of the filled circles. Conversely, when peaks appear at spatial frequencies u1 and u2 in a WS(u) spectrum, it is considered that the image includes two periodic structures corresponding to the respective spatial frequencies.

In addition, it has been found that the sensitivity of the human eye depends on the spatial frequency, and there is spatial frequency up at which the sensitivity is highest. Namely, the human eye has the characteristic that the sensitivity increases as the spatial frequency comes closer to the spatial frequency up, and the sensitivity decreases as the spatial frequency comes away from the spatial frequency up. Therefore, in an image including repeated filled circles, the filled circles become more noticeable as one of the spatial frequency u1 corresponding to the diameter of the filled circles and the spatial frequency u2 corresponding to the repetition period of the filled circles comes closer to the spatial frequency up. Conversely, the filled circles become less noticeable as the spatial frequency u1 and the spatial frequency u2 come away from the spatial frequency up. Also, the blackness of the filled circles influences noticeability. That is, it is said that if filled circles are the same size, a filled circuit of dark color formed with a dark ink such as K ink is more noticeable than a filled circle of light color formed with a light ink such as LK ink or LLK ink. The influence of blackness of filled circles is reflected as the intensity of WS(u). The WS(u) is calculated by two-dimensional fast Fourier transform (FFT) of a L* component image formed by color conversion of scan image data and then converting to a one-dimensional polar coordinate system.

The evaluation equation according to equation 1 quantifies graininess on the basis of the above-described human eye characteristics. Namely, noticeability of dots (graininess of image) is quantified as graininess index value GF by human-eye-weighting WS(u) showing periodicity of an image and integrating WS(u) with respect to spatial frequency (reference document: Makoto Fujino, The Imaging Society of Japan "Japan Hardcopy '99" P. 291-294).

FIGS. 6 and 7 indicate that as the L* value increases, the graininess index increases, and thus graininess deteriorates. It is found that particularly in a high-brightness region with an L* of 80 or more, deterioration of graininess can be significantly suppressed using P. B. 15:3.

As described above, the ink set according to the present invention can reproduce a color in a dark portion blue region having an L* value of 20 or less, an a* value of 30 or more, and a b* value of −75 or less according to CIE standards, which has so far been impossible to reproduce. Also, the ink set has excellent color reproducibility in a green region and can form a high-quality image with excellent graininess even in a high-brightness cyan region and green region.

What is claimed is:

1. An ink set comprising:
   a cyan ink composition containing C. I. Pigment Blue 15:6 as a pigment;
   a magenta ink composition containing a quinacridone pigment selected from the group consisting of C. I. Pigment Violet 19, C. I. Pigment Red 122, C. I. Pigment Red 202, and C. I. Pigment Red 209 or a quinacridone solid solution pigment composed of at least two selected from the group;
   a yellow ink composition containing a pigment selected from the group consisting of C. I. Pigment Yellow 74, C. I. Pigment Yellow 213, and C. I. Pigment Yellow 185;
   a light magenta ink composition containing a quinacridone pigment selected from the group consisting of C. I. Pigment Violet 19, C. I. Pigment Red 122, C. I. Pigment Red 202, and C. I. Pigment Red 209 or a quinacridone solid solution pigment composed of at least two selected from the group at a pigment concentration lower than that of the magenta ink composition; and
   a light cyan ink composition containing C. I. Pigment Blue 15:3 as a pigment at a pigment concentration lower than that of the cyan ink composition.

2. The ink set according to claim 1, wherein the pigment contained in at least one of the magenta ink composition and the light magenta ink composition is a quinacridone solid solution pigment composed of at least two selected from the group consisting of C. I. Pigment Violet 19, C. I. Pigment Red 122, C. I. Pigment Red 202, and C. I. Pigment Red 209.

3. The ink set according to claim 2, wherein the pigment contained in at least one of the magenta ink composition and the light magenta ink composition is a quinacridone solid solution pigment composed of C. I. Pigment Violet 19 and C. I. Pigment Red 202.

4. The ink set according to claim 3, wherein in the quinacridone solid solution pigment, the mass of C. I. Pigment Violet 19 is larger than the mass of C. I. Pigment Red 202.

5. The ink set according to claim 3, wherein in the quinacridone solid solution pigment, the mass ratio of C. I. Pigment Violet 19/C. I. Pigment Red 202 is 70/30 to 50/50.

6. The ink set according to claim 1, wherein C. I. Pigment Violet 19 contained in the quinacridone solid solution pigment is γ-type.

7. The ink set according to claim 1, wherein the pigment concentration in each of the light magenta ink composition and the light cyan ink composition is 2% by mass or less.

8. The ink set according to claim 1 comprising the cyan ink composition, the magenta ink composition, the yellow ink composition, the light magenta ink composition, the light cyan ink composition, and a black ink composition.

9. A recording apparatus comprising the ink set according to claim 1.

10. A recording method comprising depositing the ink set according to claim 1 onto a recording medium.

* * * * *